United States Patent

Schulz et al.

[11] Patent Number: 6,069,920
[45] Date of Patent: May 30, 2000

[54] METHOD AND ARRANGEMENT FOR TRANSMITTING VOICE IN A RADIO SYSTEM

[75] Inventors: Egon Schulz, Munich; Gerhard Ritter, Thaining, both of Germany

[73] Assignee: Siemens Aktiengesellschaft, Munich, Germany

[21] Appl. No.: 09/165,586

[22] Filed: Sep. 30, 1998

Related U.S. Application Data

[63] Continuation of application No. 08/373,987, Jan. 18, 1995, Pat. No. 5,896,416.

[30] Foreign Application Priority Data

Jan. 18, 1994 [DE] Germany .............................. 44 01 329

[51] Int. Cl.⁷ .................................................... H04B 14/04
[52] U.S. Cl. .......................... 375/242; 370/474; 704/214; 704/500; 714/752
[58] Field of Search .................................. 375/240, 241, 375/242; 341/87; 358/261.1, 426; 370/300, 474, 476, 477; 704/201, 208, 214, 500, 502, 503, 504; 714/752

[56] References Cited

U.S. PATENT DOCUMENTS 5,280,532  1/1994  Shenoi et al. .
5,430,774  7/1995  Dupuy .
5,473,727  12/1995  Nishiguchi et al. .

FOREIGN PATENT DOCUMENTS 0 444 592 A2  9/1991  European Pat. Off. .
0 538 546 A1  4/1993  European Pat. Off. .

OTHER PUBLICATIONS

Siemens AG, D 900, Mobile Communication System, System Description SYD, A30808–X3231–X–2–7618, Issued by the Public Communication Networks Group (1992), pp. 1–75.

Manfred Böhm et al, Mobilfunksystem, CD 900, Funk–Technik 41, No. 4, (1986), pp. 150–153.

*Primary Examiner*—Don Vo
*Attorney, Agent, or Firm*—Hill & Simpson

[57] ABSTRACT

For transmitting voice between subscriber stations of a radio system, particularly a mobile radio telephone system, whereby an analog voice signal is digitally coded by voice frames (S), the voice frames (S) are first converted into voice-coded voice frames (S1). Subsequently, a plurality of these voice frames (S1) is combined to form a multi-voice frame (MSF1). These multi-voice frames (MSF1) are transmitted with error-protection. At the reception side, the multi-voice frames (MSF4) are in turn divided into voice-coded voice frames (S4) and, subsequently, the digital voice information contained in the transmitted voice frames is in turn converted into an analog voice signal.

2 Claims, 3 Drawing Sheets

METHOD AND ARRANGEMENT FOR TRANSMITTING VOICE IN A RADIO SYSTEM

This is a continuation of U.S. patent application Ser. No. 08/373,987, filed on Jan. 18, 1995 which is now U.S. Pat. No. 5,896,416.

BACKGROUND OF THE INVENTION

The present invention is directed to a method for transmitting voice information between subscriber stations of a radio system. The present invention is also directed to an arrangement for the implementation of the method, as well as, to a subscriber station and a central station of a corresponding transmission system.

Given transmission of voice information between subscriber stations of a radio system, particularly a mobile radio telephone service, it is well known to sample analog voice information at the transmission side and to convert it into digitally coded voice information in a voice encoder and to transmit it, potentially error-protected. At the reception side, the digitally coded voice information is in turn converted into analog voice information and is then output as voice.

In a mobile radio telephone service, an area to be covered is usually divided into a large plurality of cells. Respective base stations are provided in the cells, and the connections between a public telephone network and the mobile radio equipment of the individual subscribers in a respective cell can be set up over these base stations. Such a mobile radio telephone system is, for example, the GSM (global system for mobile communication) standardized by the European Telecommunication Standards Institute (ETSI). Such a system is known from a publication of Siemens AG, D 900 Mobile Communication System, System Description, 1992 or from a publication by M. Boehm, Schaller, W., Mobilfunksystem CD 900, Funk-Technik 411, No. 4, 1986, pp. 150–153. The system identified as DCS 1800/PCN is a similar system.

In the GSM, the voice at the interface between the base stations and the mobile radio equipment is transmitted with digitally coded signals. A coding algorithm is thereby employed for the voice that implements data compression by a factor of 8 to 13 kbit/s.

In order to protect the data stream against disturbances on the radio channel, an error correction method is applied wherein redundancy is attached by channel encoding of the information to be transmitted. As a result of this channel encoding, the voice data rate is then raised from 13 kbit/s to 22.8 kbit/s.

In order, on the one hand, to be able to correct accidental bit errors and, on the other hand, bundling errors of the transmission channel, the transmitted data is also interleaved. They are divided into subblocks and transmitted. At the reception side, the subblocks are collected and deinterleaved. Thereafter, the data are supplied to an error correction means that implements an error correction of the received data and the redundancy attached at the transmission side is removed. The data obtained in this manner is supplied to the voice decoder that reconstructs the linearly quantized samples. A following digital-to-analog converter converts the digital signals into analog voice.

The time required for the transmission of a voice frame of 20 ms from a mobile radio telephone user to a fixed network subscriber, or vice versa, amounts to approximately 90 ms. Given voice transmission from a mobile radio telephone subscriber to another mobile radio telephone subscriber, this delay time is doubled and amounts to approximately 180 ms. European reference EP 04 44 592 A2 also discloses that voice frames of M subscribers are transmitted in a frame having N channels of a mobile radio telephone system. The quality of the transmitted voice, however, can suffer as a result of echoes due to this long delay time.

In order to improve the quality of the voice transmission, it is important to shorten this delay time. It would be conceivable to transmit the channel-coded voice frame in a smaller plurality of sub-blocks, whereby the plurality of bits in the sub-blocks is then increased. In this method, however, too many bits are lost in case of disturbances on the mobile radio channel, i.e. the error-protection method is not adequate given an unaltered data rate.

SUMMARY OF THE INVENTION

It is an object of the present invention to provide a method and an arrangement by which the delay time in the voice transmission is substantially reduced and existing mobile radio telephone systems need be only insignificantly modified. The present invention is also based on the object of specifying a corresponding subscriber station and a corresponding central station.

The method and the arrangement of the present invention have the advantage that the voice quality is substantially improved. They also have the advantage that an existing mobile radio telephone system can be used without substantial changes. No changes whatsoever are required in the radio-frequency part. Adaptations are merely required in the parts pertaining to the encodings.

In general terms the present invention is a method for the transmission of voice information between subscriber stations of a radio system. Analog voice information is digitally coded by voice frames and the voice frames are converted into voice-coded voice frames. These voice-coded voice frames are transmitted error-protected over at least one transmission channel. Subsequently, the digital voice information contained in the transmitted voice frames is in turn converted into analog voice information after a voice decoding. A plurality of voice-coded voice frames allocated to a subscriber are respectively combined at the transmission side to form a multi-voice frame. The multi-voice frame is divided into voice-coded voice frames at the reception side.

Advantageous developments of the present invention are as follows. The multi-voice frames are transmitted error-protected using unequally weighted error protection.

The transmission of the individual multi-voice frames ensues by division into a plurality of sub-blocks that are transmitted separately from one another. The sub-blocks are transmitted encoded.

The plurality of voice frames combined to form a multi-voice frame is defined for at least one predetermined coverage area or transmission region.

The subscriber stations are informed of the plurality of voice frames combined to form a multi-voice frame.

The subscriber stations are informed of the algorithm for combining the voice frames to form a multi-voice frame and for attaching the redundancy.

The subscriber stations are informed of a variation of the plurality of voice frames combined to form a multi-voice frame.

The determination of the plurality of sub-blocks into which a multi-voice frame is divided ensues dependent on the quality of the transmission.

The transmission is ended when the plurality of voice frames combined to form a multi-voice frame exceeds a predetermined value.

The transmission ensues over a different transmission channel when the plurality of voice frames combined to form a multi-voice frame exceeds a predetermined value.

The transmission of the multi-voice frames ensues linkwise in a line-bound network.

No multi-voice frames are transmitted during speaking pauses.

Only individual multi-voice frames with which background noises can be presented are transmitted during speaking pauses. Background noises can be generated with the individual multi-voice frames at the reception side.

The present invention is also an arrangement for transmitting voice information between subscriber stations of a radio system, wherein analog voice information in the form of voice frames is digitally coded and converted into voice-coded voice frames in a voice coder. These voice-coded voice frames are transmitted error-protected over at least one transmission channel. Subsequently, the digital voice information contained in the transmitted voice frames is in turn converted into analog voice information with a voice coder at the transmission side. This control unit respectively combines a plurality of voice-coded voice frames allocated to a subscriber to form a multi-voice frame. The voice decoder is preceded by a further control unit at the reception side that in turn divides the multi-voice frames into voice-coded voice frames.

One embodiment of the present invention is a subscriber station for the transmission of voice information from and/or to a central station of a radio system, wherein analog voice information is digitally coded in the form of voice frames and converted into voice-coded voice frames in a voice coder. These voice-coded voice frames are transmitted error-protected over at least one transmission channel. Subsequently, the digital voice information contained in the transmitted voice frames is in turn converted into analog voice information with a voice decoder. The voice coder is followed by a control unit that respectively combines a plurality of voice-coded voice frames allocated to a subscriber to form a multi-voice frame. The voice decoder is preceded by a further control unit that in turn divides the multi-voice frames into voice-coded voice frames.

Another embodiment of the present invention is a central station for transmitting voice information from and/or to a subscriber station of a radio system, wherein analog voice information is digitally coded in the form of voice frames and are converted into voice-coded voice frames in a voice coder. These voice-coded voice frames are transmitted error-protected over at least one transmission channel. Subsequently, the digital voice information contained in the transmitted voice frames is in turn converted into analog voice information with a voice decoder. The voice coder is followed by a control unit that respectively combines a plurality of voice-coded voice frames allocated to a subscriber to form a multi-voice frame. The voice decoder is preceded by a further control unit that in turn divides the multi-voice frames into voice-coded voice frames.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENT

Figure 1:
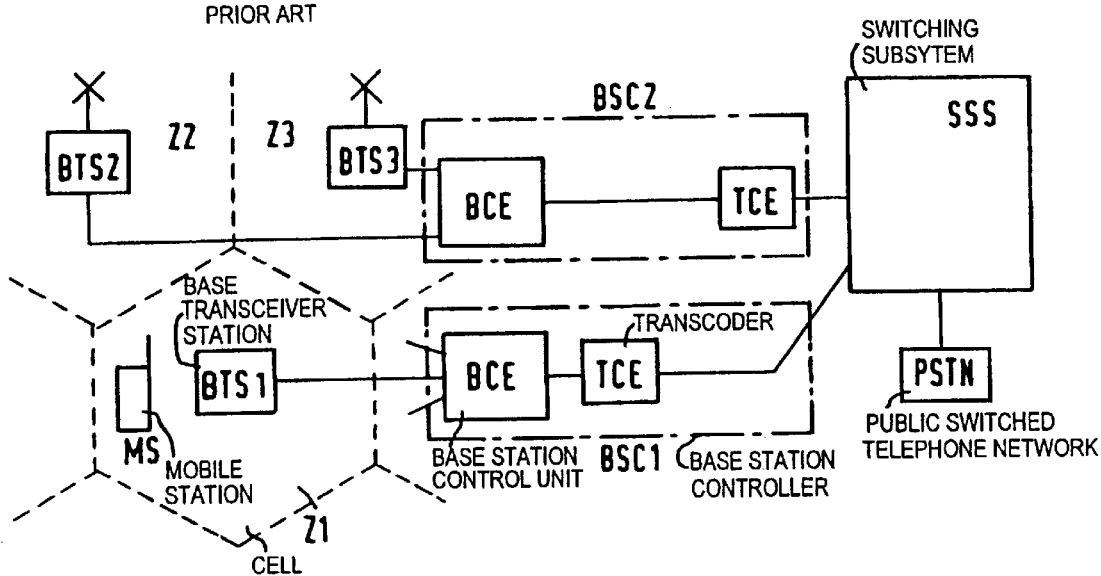
FIG. 1 is a block circuit diagram of a known mobile radio telephone system.

In the mobile radio telephone system shown in FIG. 1, a coverage area of a mobile radio telephone system operating according to what is referred to as the GSM standard (GSM denotes Global System for Mobile Communication) is divided into a plurality of cells, only the cells Z1–Z3 thereof being shown in FIG. 1. In a cell, (Z1, for example) telecommunication service from and to a mobile station (MS) is offered by a base station (BTS1—base transceiver station). In FIG. 1, only the base stations BTS1–BTS3 allocated to the cells Z1–Z3 are shown. One or more base stations are connected to a base station controller (only the base station controllers BSC1 and BSC2 are shown in FIG. 1). The base station controllers BSC1, BSC2 implement the local functions of call switching, monitoring and maintenance. They comprise base station control equipment BCE and transcoding equipment TCE. A plurality of base station controllers are connected to a switching subsystem SSS which is in turn connected to the public switched telephone network PSTN that can be fashioned as an Integrated Services Digital Network (ISDN), as a mobile radio telephone network or as some other telephone or data network.

When a subscriber having the mobile station MS serving as a subscriber station in the cell Z1 wishes to communicate with another subscriber, then a predetermined protocol is sequenced via the base transceiver station BTS1 with the base station controller BSC1, this protocol being defined, for example, in the aforementioned GSM standard. When the connection is set up between the mobile station MS and the base station controller BSC1, a connection is set up via the switching subsystem SSS to the public switched telephone network PSTN. Proceeding from the latter, the other subscriber who can in turn be provided with a mobile station is then reached.

Figure 2:
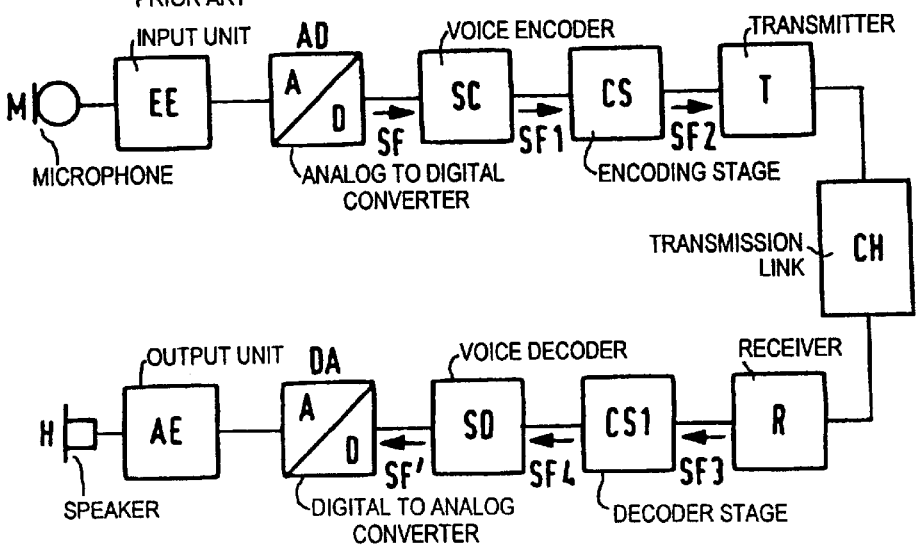
FIG. 2 is a block circuit diagram of a known voice and channel encoding system and voice and channel decoding system.

Given the block circuit diagram of a voice and channel encoding system, as well as, a corresponding decoding system shown in FIG. 2, a microphone M connected to an input unit EE converts the voice into analog voice signals that are supplied to an analog-to-digital converter AD. The analog-to-digital converter AD converts the analog voice signals into digital code words that represent samples. The sampling rate amounts, for example, to 8 kHz and the code words reproduce the samples linearly quantized with, for example, 13 bits, so that a data rate of 104 Kbit/s is present at the output of the analog-to-digital converter AD and voice frames SF each respectively composed of 160 successive code words are formed. The voice frames thus correspond to a language of 160·1/8000 s=20 ms and contain 160·13 bits=2080 bits. The analog-to-digital converter AD is followed by a voice encoder SC that, for example, works according to the RPE-LTP method (regular pulse excitation/ long term prediction). The voice encoder SC encodes every digitized 20 ms-voice frame SF in a voice-coded voice frame SF1 of 260 bits and outputs this voice frame SF1 with a rate of 50/s. Data compression of 104 kbit/s to 13 kbit/s is thus implemented by the voice encoder SC, i.e. a compression having a factor of 8.

In GSM, the voice at the interface between the respective base transceiver station BTS1 and the mobile radio equipment MS is transmitted by digitally coded signals. In order to protect the digitally coded signals against disturbances on the radio channel, an error correction method that is referred to as forward error correction FEC is employed in the encoding stage CS. In this method, the information to be transmitted, i.e. the voice data in the form of the voice-coded voice frame SF1, have redundancy added to them with a channel coding for the purpose of recognition and/or correction of errors. In GSM, an unequally weighted protection method (unequal error protection UEP) is applied to the bits of the voice data, i.e. the important bits are lent more redundancy for protection against disturbances and the less important bits are lent less redundancy or no redundancy at all. 196 bits of redundancy are attached to every voice-coded 20 ms-voice frame SF1 composed of 260 bits for protection against the disturbances and the voice frame SF2 to be transmitted then contains 456 bits. The voice data rate is then increased from 13 kbit/s to 22.8 kbit/s as a result of this channel encoding.

Figure 3:
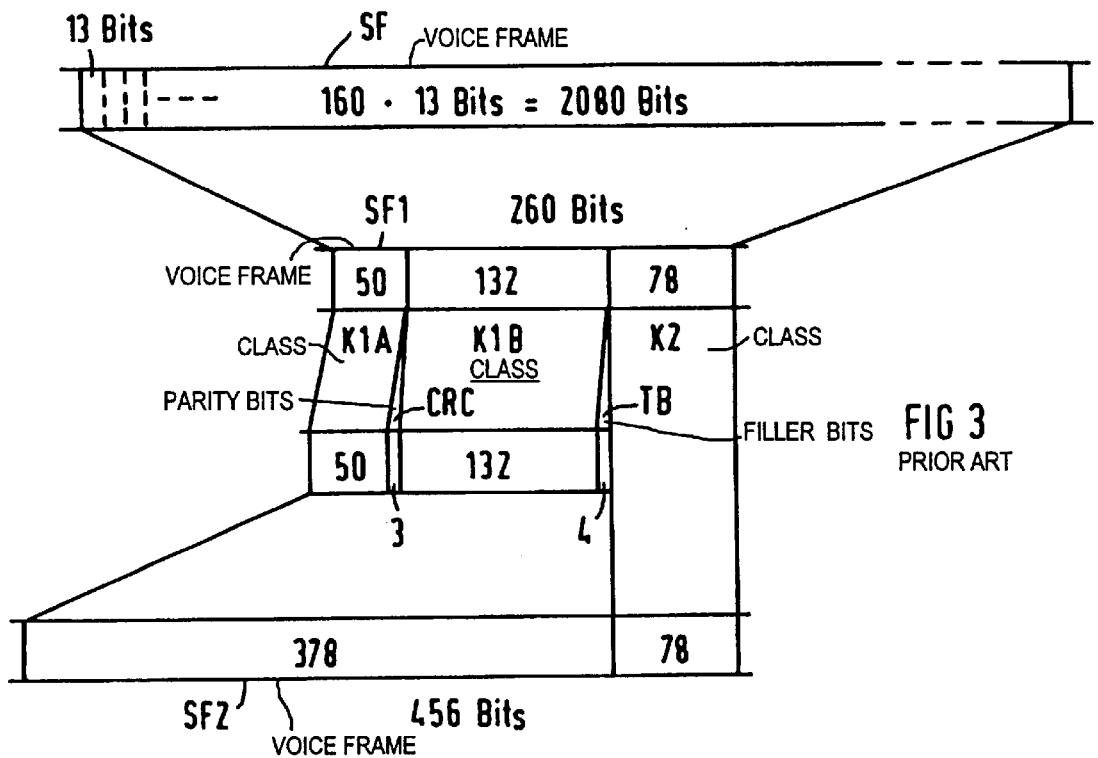
FIG. 3 is a schematic illustration of a known channel coding.

Given the channel encoding shown in FIG. 3, the voice-coded voice frames SF1 having respectively 260 bits that are output every 20 ms are divided into three classes K1A, K1B and K2 having 50,132 and, respectively, 78 bits. Three parity bits CRC are attached to the 50 bits of class K1A by the encoding the stage CS, whereas 4 filler bits TB are attached to the 132 bits of class K1B. The 189 bits deriving in this way are supplied to the encoding stage CS that generates blocks having respectively 378 bits according to a convolutional code. The 78 bits of the class K2 remain unmodified and are attached, so that the voice frame SF2 to be transmitted respectively derives having the 456 bits.

In order to be able to correct, on the one hand, accidental bit errors and, on the other hand, bundling errors of the transmission channel, the voice frames SF2 to be transmitted are separated in the transmission device T. The data is thereby interleaved. The data is divided into eight sub-blocks having 57 bits each and a respective sub-block is transmitted within 4.615 ms. The data to be transmitted can also be encoded before it is processed in a multiplexor and transmitted via the transmission link CH.

At the reception side, the transmitted data is processed in reception equipment R in a demultiplexor, is decoded and the 8 sub-blocks are collected and de-interleaved. After this, the 456 bits are supplied as voice frame SF3 to an error correction means CS1 that implements an error correction of the transmitted data and that removes the redundancy that was attached at the transmission side. The voice frames SF4 obtained in this way and having receptively 260 bits each are supplied to the voice decoder SD and the latter reconstructs the voice frame SF' having the 160 code words each respectively linearly quantized with 13 bits. A following digital-to-analog converter DA in turn generates analog voice signals from the code words and outputs these voice signals to a playback unit H via an output unit AE.

The time required for the transmission of a 20 ms voice frame from a mobile radio telephone subscriber to a fixed network subscriber or vice versa amount to approximately 90 ms and is composed in approximately the following way:

| Voice Frame | 20.0 ms |
|---|---|
| Transmission of the Sub-Blocks | 37.5 ms |
| Signal Processing Time | 27.5 ms |
| Transmission Time (Terrestrial) | 5.0 ms |
| Total Delay Time | 90.0 ms |

The delay time is doubled given a voice transmission from one mobile radio telephone subscriber to another mobile radio telephone subscriber and amounts to approximately 180 ms (2×90 ms). The quality of the transmitted speech can suffer due to this long delay time as a result of echoes.

Figure 4:
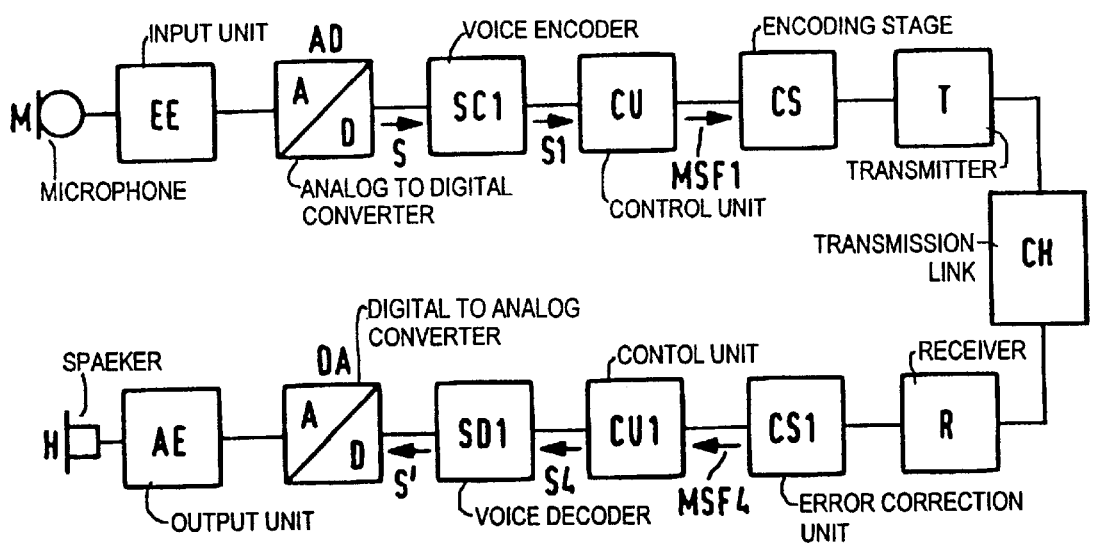
FIG. 4 is a block circuit diagram of a channel coding system of the present invention.

In the block circuit diagram shown in FIG. 4, which partially corresponds to the block circuit diagram shown in FIG. 2, the voice encoder SC1 employs an algorithm that is defined in the ITU Recommendation G.728 ("Coding of speech at 16 kbit/s low delay-code excited linear prediction (LDF-CELP)"). The voice encoder SC1 is followed by a control unit CU that respectively joins a plurality of voice frames S1 output by the voice encoder SC1 to form a multi-voice frame MSF1. The latter can be processed in a way corresponding to the arrangement known from FIG. 2. At the reception side, the corresponding voice decoder SD1 is preceded by a control unit CU1 that separates the multi-voice frame MSF4 into corresponding voice frames S4. These voice frames S4 are in turn converted in the voice decoder SD1 into voice frames S' that correspond to the voice frames S. Subsequently, the digital-to-analog converter DA in turn converts the code words of the voice frames S' into analog voice signals that are output via the output unit AE to the playback unit H.

Figure 5:
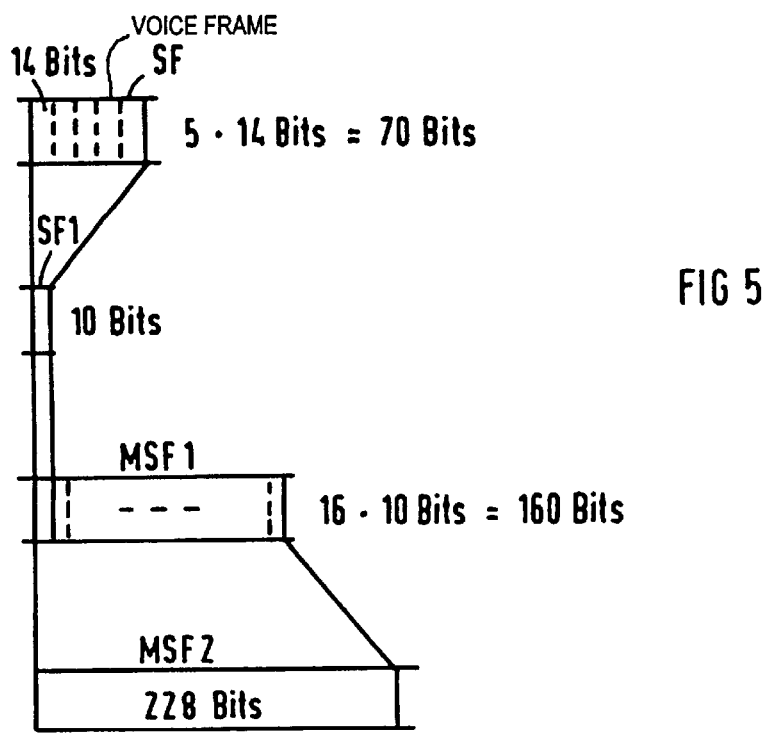
FIG. 5 is a schematic illustration of the channel coding of the present invention.

In this case, the voice frames S output by the voice encoder SC1, shown in illustration FIG. 5, are composed of 5 code words that are allocated to the samples, whereby every sample is linearly quantized with 14 bits. The sampling rate amounts to 8000/s. The duration of a voice frame S thus amounts to 0.625 ms (5×0.125 ms). The 16 kbit/s LD-CELP voice encoder SC supplies a voice-coded voice frame S1 composed of 10 bits for every voice frame composed of 5 code words. This means that the voice encoder SC1 processes voice frames S having a length of 0.625 ms. The processing time of a voice frame S of the 16 kbit/s LD-CELP voice encoder SC amounts to only approximately 2 ms.

A plurality of voice-coded voice frames S1 composed of 10 bits can now be combined to form a multi-voice frame MSF1. When for example, 16 voice frames S1 are combined to form a multi-voice frame MSF1, then the multi-voice frame MSF1 contains 160 bits and this corresponds to a speech interval of 10 ms (16×0.625 ms). 16 bits of error-recognizing and/or error-correcting redundancy are added to this multi-voice frame MSF1 with the channel encoding and the channel-coded multi-voice frame MSF2 for 10 ms speech then has 228 bits. This multi-voice frame MSF2 is divided (corresponding to the known transmission method shown in FIG. 2) into 4 sub-blocks each respectively composed of 57 bits and one sub-block is transmitted per 4.615 ms. As a result of applying this method, thus, the delay time for the voice transmission is reduced by more than 50 ms, namely

| | |
|---|---:|
| Voice Frame | 10.0 ms |
| Transmission of the Sub-Blocks | 18.0 ms |
| Signal Processing Time | 2.0 ms |
| Transmissiom Time (Terrestrial) | 5.0 ms |
| Total Delay Time | 35.0 ms |

Smaller or larger multi-voice frames MSF1 can also be formed. A 20 ms multi-voice frame MSF1 is composed of 320 bits or, respectively, 32 LD-CELP voice frames S1. A 5 ms multi-voice frame MSF1 is composed of 8 voice frames S1 or, respectively, 80 bits and a 2.5 ms multi-voice frame MSF1 is composed of 40 bits or, respectively, of 4 voice frames S1.

All multi-voice frames MSF need not be transmitted during speaking pauses. Either no multi-voice frame MSF or only individual, i.e. one or a few multi-voice frames MSF can then be transmitted. If only individual multi-voice frames MSF are transmitted, characteristic features, particularly background noises, are transmitted with these. Corresponding background noises are then produced at the reception side from the individually transmitted multi-voice frames.

It is also possible to vary the plurality of voice-coded voice frames S1 in a radio system, for example the mobile radio telephone system. This variation can ensue dependent on the quality of the transmission in the various coverage areas, i.e. particularly within the various cells. Beginning with a predetermined plurality, a cleardown of the connection can also ensue or a transmission over a different transmission channel can ensue, via a different cell (handover). It is also possible to vary the plurality dynamically or quasi-statically. To this end, for example, the mobile station MS in the cell Z1 is informed what plurality it should use for one or more transmissions.

The combining of a plurality of voice-coded voice frames S1 to form a multi-voice frame MSF1 can be employed not only in mobile radio telephone systems, but can also be advantageously utilized in other radio systems or in line-bound systems.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmission of voice information between subscriber stations of a radio system, comprising the steps of:

providing input analog voice information;

digitally encoding said analog voice information to produce input voice frames;

converting the input voice frames into first voice-coded voice frames;

combining a plurality of first voice-coded voice frames, that are allocated to a subscriber, to form a multi-voice frame;

error protection encoding said multi-voice frame;

dividing said multi-voice frame into a plurality of sub-blocks;

transmitting said sub-blocks separately from one another on at least one transmission channel;

receiving said sub-blocks from said at least one transmission channel;

reforming said multi-voice frame;

error protection decoding said multi-voice frame;

dividing the received multi-voice frame into second voice-coded voice frames;

digitally decoding said second voice-coded voice frames to produce output voice frames; and converting digital information in the output voice frames into analog voice information;

wherein determination of the plurality of voice frames combined to form a multi-voice frame ensues dependent on a level of quality of said at least one transmission channel in combination with the delay in transmission of the multi-voice frame.

2. The method according to claim 1, wherein the determination of the plurality of sub-blocks into which a multi-frame is divided ensues dependent on a level of quality of the transmission.

* * * * *